United States Patent
Proksa

(10) Patent No.: US 8,615,120 B2
(45) Date of Patent: Dec. 24, 2013

(54) SPECTRAL IMAGING

(75) Inventor: Roland Proksa, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 324 days.

(21) Appl. No.: 13/054,097

(22) PCT Filed: Jul. 14, 2009

(86) PCT No.: PCT/IB2009/053052
§ 371 (c)(1),
(2), (4) Date: Jan. 14, 2011

(87) PCT Pub. No.: WO2010/015953
PCT Pub. Date: Feb. 11, 2010

(65) Prior Publication Data
US 2011/0123082 A1    May 26, 2011

Related U.S. Application Data

(60) Provisional application No. 61/085,932, filed on Aug. 4, 2008.

(51) Int. Cl.
*G06K 9/00* (2006.01)
*G01F 1/66* (2006.01)
*A61B 5/05* (2006.01)

(52) U.S. Cl.
USPC .................. 382/131; 378/51; 600/410

(58) Field of Classification Search
USPC ......... 382/128–132; 378/53, 62–63; 600/410, 600/458
See application file for complete search history.

(56) References Cited

U.S. PATENT DOCUMENTS

| 6,464,643 | B1 * | 10/2002 | Brock-Fisher | 600/458 |
| 6,571,116 | B2 | 5/2003 | Wake et al. | |
| 6,738,658 | B2 | 5/2004 | Wake et al. | |
| 6,934,353 | B2 | 8/2005 | Wang | |
| 2005/0084073 | A1 * | 4/2005 | Seppi et al. | 378/156 |
| 2006/0078182 | A1 * | 4/2006 | Zwirn et al. | 382/128 |
| 2007/0073114 | A1 * | 3/2007 | Gundel | 600/300 |
| 2007/0217570 | A1 | 9/2007 | Grasruck et al. | |
| 2008/0253503 | A1 * | 10/2008 | Proksa | 378/5 |

FOREIGN PATENT DOCUMENTS

| WO | 0185010 A2 | 11/2001 |
| WO | 2007034356 A2 | 3/2007 |
| WO | 2008021664 A1 | 2/2008 |

OTHER PUBLICATIONS

Roessl, E., et al.; K-edge imaging in x-ray computed tomography using multi-bin photon counting detectors; 2007; Phys. Med. Biol.; 52:4679-4696.

Schlomka, J. P., et al.; Experimental feasibility of multi-energy photon-counting K-edge imaging in pre-clinical computed tomography; 2008; Phys. Med. Biol.; 53:4031-4047.

\* cited by examiner

*Primary Examiner* — Amara Abdi

(57) ABSTRACT

A system includes an image estimator (128) that generates estimated native image data from data acquired when a K-edge material is present in a scanned region during data acquisition, wherein the estimated native image data is indicative of native image data generated from data acquired when the K-edge material is not present in the scanned region during the data acquisition.

19 Claims, 3 Drawing Sheets

SPECTRAL IMAGING

CROSS REFERENCE TO RELATED APPLICATIONS

This application claims the benefit of U.S. provisional application Ser. No. 61/085,932 filed Aug. 4, 2008, which is incorporated herein by reference.

The following generally relates to spectral imaging, and finds particular application to computed tomography (CT). However, it also amenable to other medical imaging applications and to non-medical imaging applications.

A conventional computed tomography (CT) scanner includes an x-ray tube mounted on a rotatable gantry opposite one or more detectors. The x-ray tube rotates around an examination region located between the x-ray tube and the one or more detectors and emits polychromatic radiation that traverses the examination region and a subject and/or object disposed in the examination region. The one or more detectors detect radiation that traverses the examination region and generate a signal indicative of the examination region and the subject and/or object disposed therein. A reconstructor reconstructs the signal to generate volumetric image data thereof, which can be used to generate an image(s) of the subject and/or object. Such an image includes pixels that typically are represented in terms of gray scale values corresponding to relative radiodensity.

The gray scale values of such an image reflect the attenuation/absorption characteristics of the scanned subject and/or object, and generally show structure such as anatomical structures within a patient, physical structures within an inanimate object, and the like. However, since the absorption of a photon by a material is dependent on the energy of the photon traversing the material, the detected radiation also includes spectral information, which provides additional information such as information indicative of the elemental or material composition (e.g., atomic number) of the tissue and/or material of the subject and/or object. Unfortunately, conventional CT projection data does not reflect the spectral characteristics as the signal output by the one or more detectors is proportional to the energy fluence integrated over the energy spectrum.

A spectral CT scanner includes an energy resolving detector that produces an electrical signal indicative of the energy of a detected photon and, as noted above, such spectral information can be used to determine elemental composition. A form of spectral CT generally referred to as K-edge imaging leverages the fact that high-Z elements tend to attenuate photons to a much higher extent above a particular energy, the K-edge energy of the given element, relative to attenuating photons just below the K-edge energy. The discontinuity in the attenuation can be detected. As such, a K-edge material with known K-edge energy, which is within the diagnostic energy spectrum (about 50 to 150 keV), can be administered to a subject or object, and the data from an energy resolved acquisition can be used to generate at least two images, a K-edge image showing the K-edge material and a conventional attenuation image, which generally excludes the K-edge material. If multiple K-edge materials are administered, an image for each K-edge material can be generated.

Unfortunately, the attenuation image generated with data from a K-edge spectral scan, where a K-edge material has been administered to the subject or object, would not be the same as an attenuation image generated with data from a conventional scan where the K-edge material had not been administered to the subject or object. One reason for this is that the K-edge material administered to the subject or object displaces natural radiation absorbing material that would otherwise be present where the K-edge material is present. By way of example, an attenuation image generated with data from an angiography scan without contrast would show blood in the vessel lumen. In contrast, an attenuation image generated with data from an angiography scan with contrast would show both contrast and blood in the vessel lumen, with the contrast material displacing some of the blood that would otherwise be in the vessel lumen.

As a consequence, the anatomical structure common to both images would appear lighter (lower attenuation) in the attenuation image from the contrast scan relative to the attenuation image from the scan without contrast. The foregoing is due to the missing absorption of the displaced blood, which lowers the density. Unfortunately, this may result in an erroneous interpretation of the attenuation image generated from the contrast scan as it may not be readily apparent whether a less dense area in the image is due to the presence of less dense tissue (e.g., due to the presence of a tumor) or the presence of the contrast material. Of course, the above phenomenon is not limited to blood displacement in the vessel lumen. Generally, this may occur in any instance in which an administered material displaces a radiation absorbing material native to the subject. For example, the above may also occur with contrast studies involving intercellular fluid, brain fluid, spinal fluid, blood in other vascular tissue, and one or more other contrast material displaceable fluids.

Aspects of the present application address the above-referenced matters and others.

According to one aspect, a system includes an image estimator that generates estimated native image data from data acquired when a K-edge material is present in a scanned region during data acquisition, wherein the estimated native image data is indicative of native image data generated from data acquired when the K-edge material is not present in the scanned region during the data acquisition.

According to another aspect, a method includes generating first image data, which is indicative of image data generated from data acquired during a no contrast imaging procedure performed without contrast, from image data acquired during a contrast imaging procedure performed with contrast.

According to another aspect, a method includes performing a contrast based spectral imaging procedure on a region of a subject or object, wherein the procedure includes using a contrast agent including at least one contrast material with a known K-edge energy, generating image data based on image data generated from the spectral imaging procedure, generating a correction factor for the image data, wherein the correction factor takes into account radiation absorbing material native to the subject or object that has been displaced by the contrast agent during the spectral imaging procedure, and generating estimated native image data based on the image data and the correction factor.

The invention may take form in various components and arrangements of components, and in various steps and arrangements of steps. The drawings are only for purposes of illustrating the preferred embodiments and are not to be construed as limiting the invention.

As used herein, the phrase "native image" refers to an attenuation image or image data generated with data acquired during a procedure in which a foreign material foreign to the subject or object, such as a contrast agent, is not present in the scanned region of the subject or object during the scan. The phrase "foreign image" refers to an attenuation image or image data generated with data acquired during a procedure in which the foreign material is present in the scanned region of the subject or object during the scan and the foreign material has displaced or replaced material native to the subject or object. The phrase "estimated native image" refers to an estimation of the native image from data acquired during the procedure in which the foreign material is present in the scanned region of the subject or object during the scan and the material has displaced or replaced native material. For explanatory purposes and sake of brevity, the following is described in the connection with a contrast agent including at least one K-edge material and a human subject. However, it is to be understood that the foreign material can be any foreign material that when administered to a subject or object, displaces or replaces radiation absorbing material that is native to the subject or object.

Figure 1:
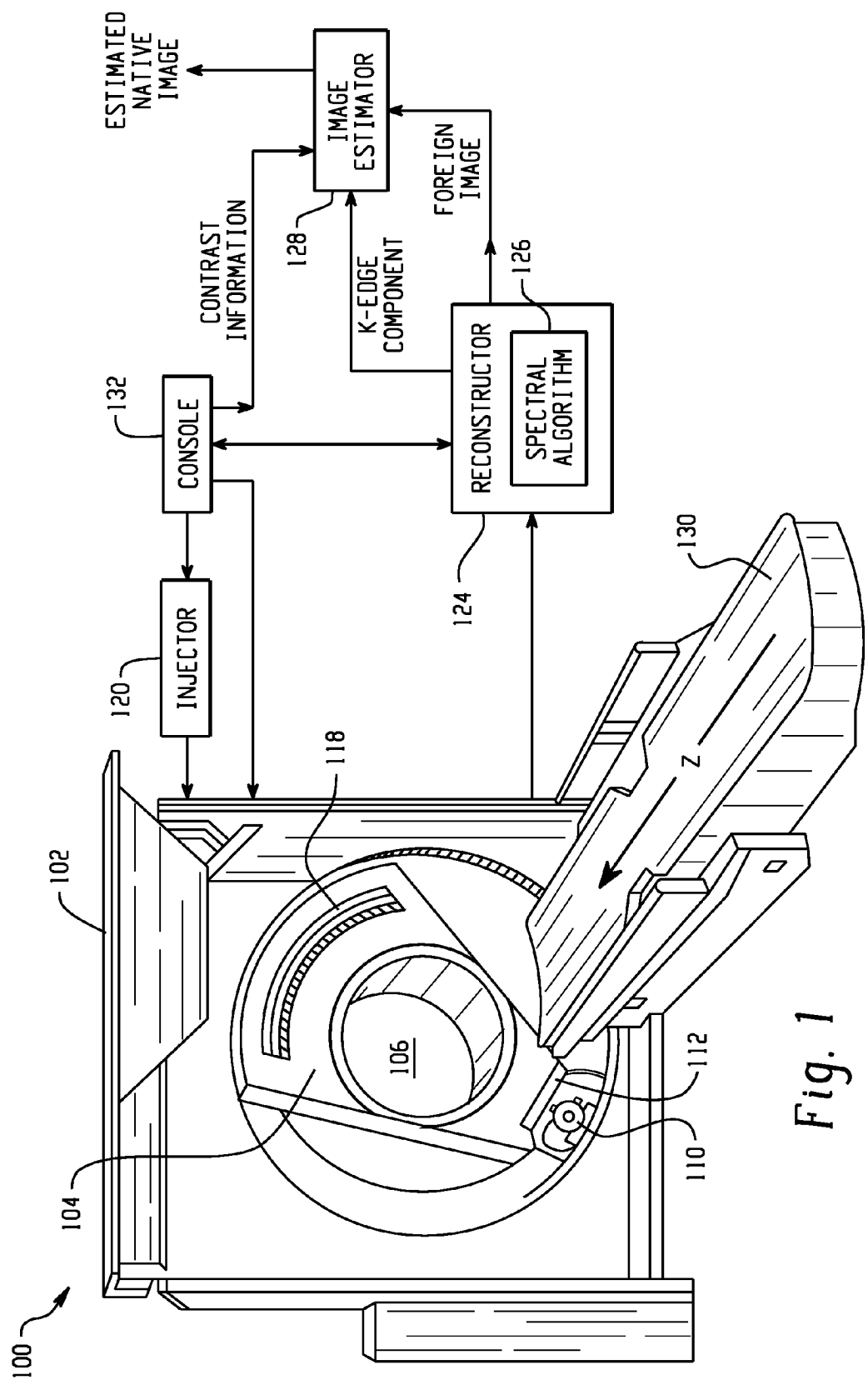
FIG. 1 illustrates an example imaging system.

Turning to FIG. 1, a computed tomography (CT) scanner 100 is illustrated. The CT scanner 100 includes a stationary gantry 102 and a rotating gantry 104, which is rotatably supported by the stationary gantry 102. The rotating gantry 104 rotates around an examination region 106 about a longitudinal or z-axis 108.

A radiation source 110, such as an x-ray tube, is supported by and rotates with the rotating gantry 104 around the examination region 106 and emits polychromatic radiation. A collimator 112 collimates the emitted radiation to produce a generally fan, wedge, or cone shaped radiation beam that traverses the examination region 106.

A radiation sensitive detector array 118 includes one or more rows of detector elements that detect photons that traverse the examination region 106 and generates a signal or projection data indicative the examination region 106.

An injector 120 is configured to inject or administer a material such as one or more contrast agents to an object or subject, such as a patient, being scanned. The contrast agent may include a single contrast material or multiple contrast materials, including one or more K-edge materials. Generally, an administered contrast agent displaces or replaces native material such as a fluid in the region of the subject or object being scanned. For instance, with a human subject, the contrast agent may displace or replace blood, intercellular fluid, cerebral fluid, spinal fluid, and/or another fluid in the subject, depending on the procedure being performed. A contrast agent can alternatively be manually administered by a clinician or the like.

A reconstructor 124 reconstructs the signal and generates volumetric image data indicative thereof. In one instance, the reconstructor 124 employs a spectral algorithm 126. Such an algorithm may include decomposing the data into various spectral components, such as one or more K-edge components for one or more K-edge materials in an administered contrast agent. Other suitable components include a Compton effect component and a photo-electric effect component. The reconstructor 124 may also employ conventional reconstruction algorithms, for example, a filtered backprojection algorithm or an iterative reconstruction algorithm.

An image estimator 128 processes the data and generates one or more images such as a contrast only image and an estimated native image. As described in greater detail below, in one instance the image estimator 128 takes into account the attenuation of a material such as a fluid that is native to the subject or object, but displaced by a contrast material during the imaging procedure. This may include generating a correction factor, based on the concentration of the displacing material and the attenuation of the displaced or replaced material, and applying the correction factor to the foreign image to generate the estimated native image. In one instance, the estimated native image is more similar to the native image relative to the foreign image. For instance, the attenuation values for the estimated native image may be more similar to the attenuation values for the native image relative to the attenuation values for the foreign image.

A patient support 130, such as a couch, supports the patient for the scan.

A general purpose computing system 132 serves as an operator console. Software resident on the console 132 allows the operator to interact with the system 100 such as selecting the imaging protocol such as a spectral reconstruction protocol employing a K-edge algorithm in which an estimated native image is generated, inputting information used to estimate the native image, and/or otherwise interact with the scanner 100. The console 132 and/or other display may also be used to display and compare image data such as contrast only image data and estimated native image data. Such images have a common or correlated attenuation, unlike the foreign image data.

Figure 2:
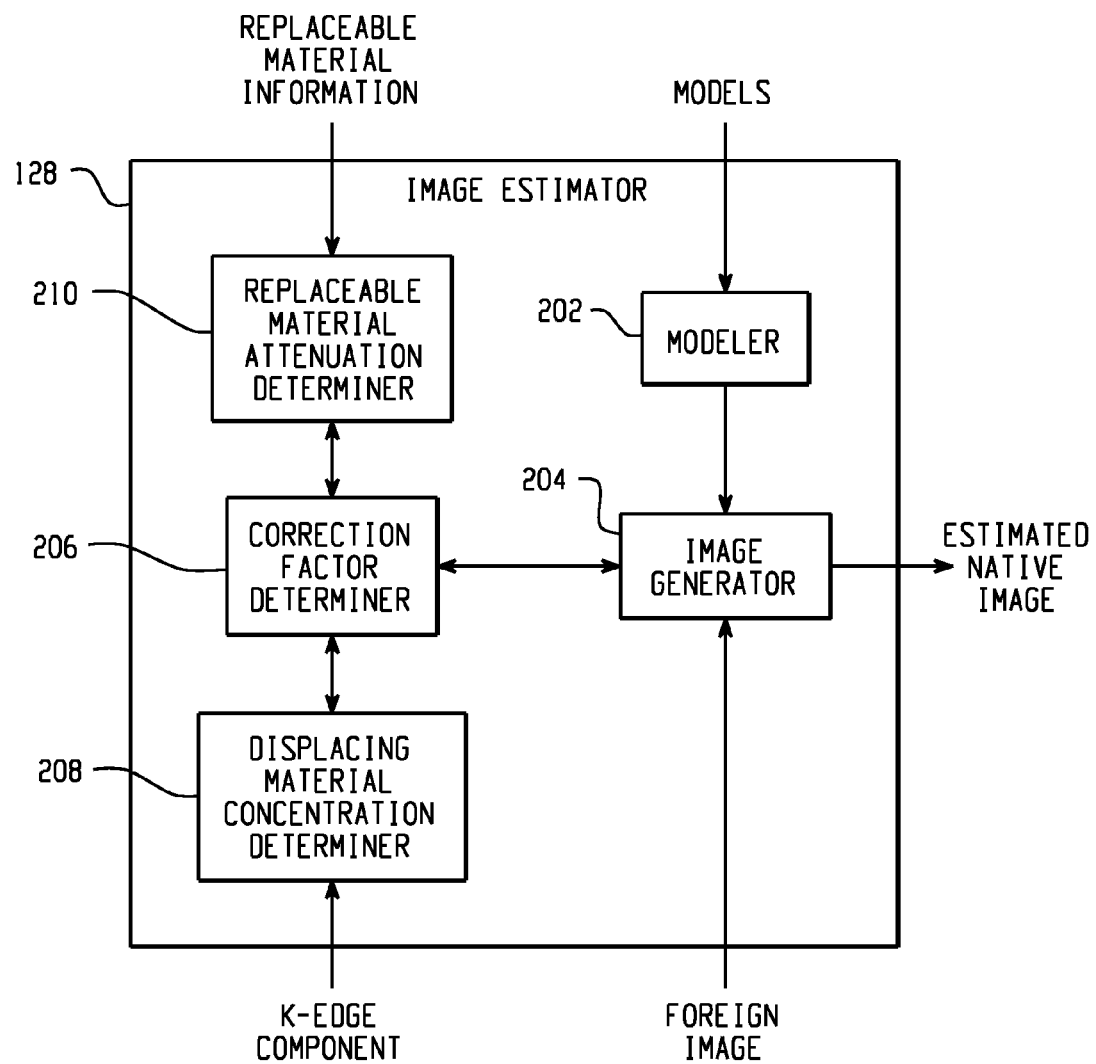
FIG. 2 illustrates an example image generator.

FIG. 2 illustrates an example image estimator 128. The illustrated image estimator 128 includes a modeler 202, which provides a model used to generate the estimated native image. Generally, such a model models the scanned region of interest. For example, a suitable model may model the scanned region of interest as a function of native material that is not displaced by a foreign material such as a contrast agent in the subject or object, native material that is displaced by the contrast agent in the subject or object, and the contrast agent. Such a model may be represented in terms of a mathematical equation or otherwise. In one instance, the modeler 202 generates the model. In this instance, the model may be based on the selected imaging protocol, the region of interest, and/or other information about the imaging procedure. In another instance, a pre-determined model is provided to the modeler 202. In either instance, the model can be modified.

The following example illustrates a non-limiting, suitable model. For explanatory purposes, assume that an administered contrast agent includes a single contrast material, which displaces a native material in a region of a subject or object being imaged. For this example, the scanned region is modeled as including three different components: (1) background material (B), which is not or substantially is not displaced or replaced by the contrast agent; (2) the native or replaceable material (R), which is displaced or replaced by the contrast agent; and (3) the displacing material (D). In other embodiments, the model can be based on other and/or additional components. For example, more than one displacing material may be present, more than one replaceable material may be displaced, the background material may also include replaceable material, etc.

Under the above, a suitable model includes the model of Equation 1, $$\mu_{Estimate} = \mu_{Foreign} + c_D \mu_R, \quad \text{Equation 1:}$$

wherein $\mu_{Estimate}$ represents the attenuation for the estimated native image, $\mu_{Foreign}$ represents the attenuation for the foreign image, and $c_D \mu_R$ represents a correction factor, wherein $c_D$ represents the concentration of the displacing or replacing material D and $\mu_R$ represents the attenuation of the displaced or replaced material R.

The following provides an example derivation for Equation 1. The corresponding attenuation coefficients for background material, the replaceable material and the displacing material can respectively be represented as $\mu_B$, $\mu_R$ and $\mu_D$. The relative volumetric concentrations of these materials in the scanned region can respectively be represented as $c_B$, $1-cB$, 0 in the native (without the displacing material) image and $c_B$, $1-c_B-c_D$, $c_D$ in the foreign (with the displacing material) image.

Figures 3, 4:
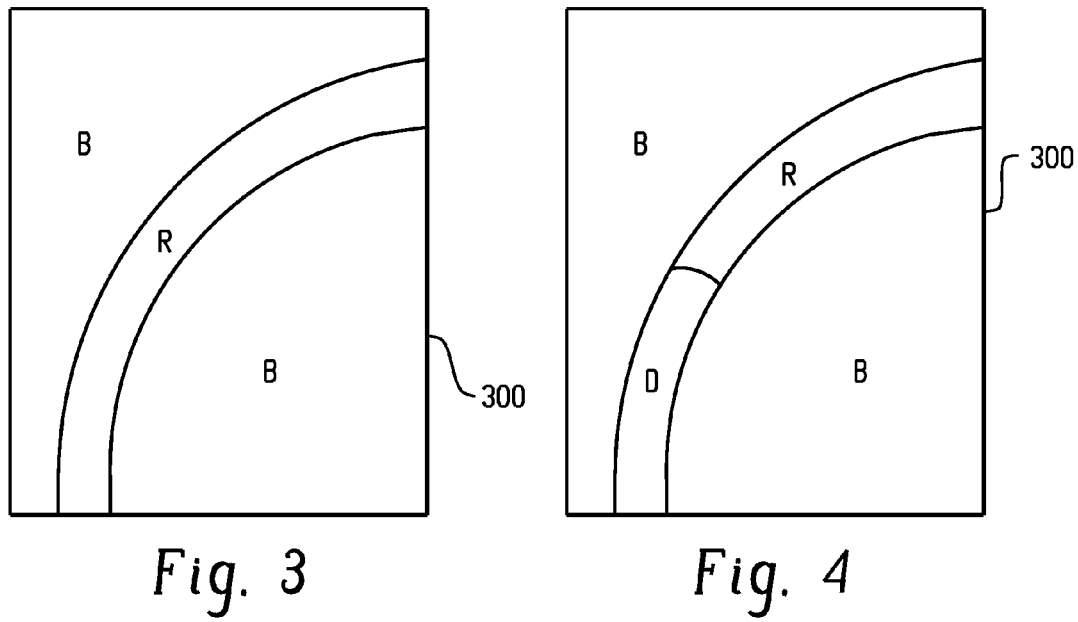
FIG. 3 illustrates an example image showing replaceable and non-replaceable material from a no contrast study.
FIG. 4 illustrates an example image showing replaceable, non-replaceable, and contrast material from a contrast study.

FIGS. 3 and 4 respectively illustrate examples showing background B and displaceable R materials and background B, replaceable R, and displacing D materials in a region of interest 300. In FIG. 4, the displaceable material D has displaced a portion of the replaceable material relative to FIG. 3.

The native image may show an effective attenuation as a function of Equation 2:

$$\mu_{Native} = c_B\mu_B + (1-c_B)\mu_R, \text{ and} \quad \text{Equation 2:}$$

the foreign image may show an effective attenuation as a function of Equation 3:

$$\mu_{Foreign} = c_B\mu_B + (1-c_B-c_D)\mu_R, \quad \text{Equation 3:}$$

An effective attenuation for an estimated native image, Equation 1, can be derived from Equations 2 and 3, using an estimated $\mu_R$.

An image generator 204 generates the estimated native image based on the model from the modeler 202. In this example, image generator 204 generates the estimated native image based Equation 1, which includes two components, the foreign image effective attenuation $\mu_{Foreign}$ and the correction factor $c_D\mu_R$.

The foreign image effective attenuation $\mu_{Foreign}$ can be obtained from the reconstructor 124 or elsewhere such as the console 132, a memory storage device, etc.

A correction factor determiner 206 determines the correction factor $c_D\mu_R$.

A displacing material concentration determiner 208 determines a concentration $c_D$ of the displacing material D, which is substantially equal the amount of replaceable material R being displaced. In one instance, the concentration $c_D$ of the displaceable material D is determined based on the K-edge component from the spectral decomposition. For example, the concentration $c_D$ of the displaceable material D can be determined as a function of Equation 4:

$$c_D = \mu_{K\text{-}edge}/\mu D, \quad \text{Equation 4:}$$

wherein $\mu_{K\text{-}edge}$ is an effective attenuation of the K-edge material, or the K-edge component from the spectral decomposition.

A replaceable material attenuation determiner 210 determines an estimated effective attenuation $\mu_R$ of the replaceable material R. Various techniques can be used to determine the estimated effective attenuation $\mu_R$ of the replaceable material R. For example, in one instance the effective attenuation $\mu_R$ determined by assuming that there is only displaceable background. In this case, $c_B=0$, and $\mu_R$ can be estimated as $\mu_{Foreign}/(1-c_D)$. In another instance, the effective attenuation $\mu_R$ of the replaceable material R is measured, or known and assumed to be constant in the acquired images at particular places, for example, where the absence of the displacing material D can be assumed.

With the information from the displacing material concentration determiner 208 and the replaceable material attenuation determiner 210, the correction factor determiner 206 determines the correction factor $c_D\mu_R$ and provides the correction factor to the image generator 204, which applies the correction factor $c_D\mu_R$ to the foreign image $\mu_{Foreign}$, for example, based on Equation 1, to generate the estimated native image. It is to be appreciated that this can be done on a pixel-by-pixel or voxel-by-voxel basis, or otherwise.

In the case of multiple K-edge materials, a different estimated native image can be generated based on each of one or more of the different K-edge materials, and the resulting different estimated native image can be combined to generate an overall estimated native image.

Figure 5:
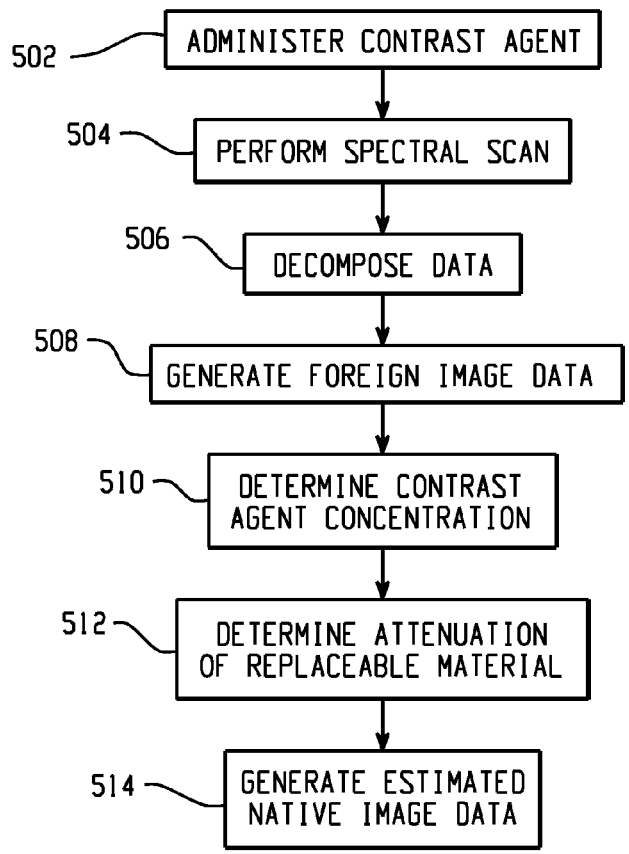
FIG. 5 illustrates an example method.

FIG. 5 illustrates a method for generating an estimated native image. For explanatory purposes, this method is describe in relation to a contrast agent administered to a subject for a contrast based imaging procedure. In addition, the acts and/or the order of the acts is not limiting. For example, one or more of the acts may occur in a different order and/or one or more additional acts may be included and/or one or more of the acts may be omitted.

At 502, a contrast agent or other material with a K-edge material is administered to a subject. For diagnostic imaging, a suitable K-edge material includes a K-edge material with a K-edge energy in the diagnostic imaging range (about 50 to 150 keV). At 504, a spectral scan is performed. At 506, a spectral decomposition is performed to generate at least a K-edge component. At 508, the scan data is reconstructed to generate at least foreign image data. Other image data such as a contrast only image data and/or image data based on other spectral components such a Compton effect component, a photo-electrical effect component, and/or a combination of the various components can also be generated.

At 510, the concentration of the contrast agent is determined as described herein, for example, based on the K-edge component from the decomposition. At 512, the effective attenuation of the replaceable material is estimated, measured, or otherwise determined. At 514, the estimated native image data is generated. As discussed herein, this may be achieved based on the foreign image data, the concentration of the contrast agent and the effective attenuation of the replaceable material, for example, via Equation 1 or otherwise. Other approaches may also be used.

As noted above, the reconstructor 124 can employ a spectral algorithm such a K-edge algorithm. The following illustrates an example algorithm for one K-edge material. Generally, the radiation source 110 emits polychromatic radiation with an emission spectrum $T(E)$. The detection signal of the i-th detector channel is indicated by $d_i$ and can be described by Equation 5:

$$d_i = \int dE T(E) D_i(E) \exp(-(\rho_{photo}P(E) + \rho_{compton}C(E) + \rho_{k\text{-}edge1}K(E))) \quad \text{EQUATION 5:}$$

wherein $D_i(E)$ is the spectral sensitivity of the i-th detector channel, $\rho_{photo}$, $\rho_{compton}$, and $\rho_{K\text{-}edge}$ are the density length products of the photo-electric effect, the Compton effect, the K-edge effect of the material, and the energy dependent absorption spectra of the photo-electric effect, the Compton effect and the K-edge effect are indicated by $P(E)$, $C(E)$, and $K(E)$, respectively. For N contrast materials, Equation 5 includes the following terms $\rho_{k\text{-}edge1}K_1(E) \ldots \rho_{K\text{-}edge(2+N)}K_{N+2}(E)$.

The input to the reconstructor 124 includes the energy-resolved detection signals $d_i$ for a plurality, e.g., three (3), energy bins. The emission spectrum $T(E)$ and spectral sensitivity $D_i(E)$ generally are known. The absorption spectra $P(E)$, $C(E)$, and $K(E)$ are known. Since the energy dependent functions and the detection signals $d_i$ are known and since at least three detection signals $d_1$-$d_3$ are available for at least three energy bins $b_1$-$b_3$, a system of at least three equations is formed having three unknowns which can thus be solved with known mathematical methods. If more than three energy bins are available, a maximum likelihood or other approach that takes noise statistics of the measurements into account.

The resulting density length product $\rho_{K\text{-}edge}$ is the contribution of the K-edge material and can be used to generate a K-edge image for the K-edge material. With this information, the Equation 5 can be used to determine the estimate, and an estimated image, an anatomical image, and a conventional CT image can be generated.

In another embodiment, one or more of a Compton effect image and a photo-electric effect image can be generated based on corresponding density length product $\rho_{photo}$ and $\rho_{compton}$. In another embodiment, an image can be generated based on one or more of Compton effect component, the photo-electric effect component, the anatomic component, and the estimated native component.

The invention has been described herein with reference to the various embodiments. Modifications and alterations may occur to others upon reading the description herein. It is intended that the invention be construed as including all such modifications and alterations insofar as they come within the scope of the appended claims or the equivalents thereof.

I claim:

1. A system, comprising:
an image estimator that generates estimated native image data from data acquired when a K-edge material is present in a scanned region during data acquisition, wherein the estimated native image data is indicative of native image data generated from data acquired when the K-edge material is not present in the scanned region during the data acquisition, and the estimated native image data is generated based on a concentration of the K-edge material that displaces a replaceable material native to the subject during the data acquisition and an effective attenuation of the replaceable material native to the subject.

2. The system of claim 1, wherein the image estimator generates the estimated native image data based on an effective attenuation of the K-edge material.

3. The system of claim 1, wherein the K-edge material is a contrast agent, including one or more contrast materials.

4. The system of claim 2, further including a reconstructor that generates foreign image data, which is indicative of image data generated from the data acquired when the K-edge material is present in the scanned region during the data acquisition but excluding the attenuation of the K-edge material, and wherein the image estimator generates the estimated native image data based on the foreign image data.

5. The system of claim 4, wherein the image estimator includes:
a correction factor determiner that generates a correction factor for the foreign image data; and
an image generator that generates the estimated native image data based on the foreign image data and the correction factor.

6. The system of claim 5, wherein the image generator applies the correction factor to the foreign image data on a pixel-by-pixel or voxel-by-voxel basis to generate the estimated image data.

7. The system of claim 6, wherein the correction factor is a function of the concentration of the K-edge material that displaces the replaceable material native to the subject and an effective attenuation of the replaceable material.

8. The system of claim 7, wherein the replaceable material is one or more of blood, intercellular fluid, cerebral fluid, and spinal fluid.

9. The system of claim 6, wherein the concentration of the K-edge material is a function of the effective attenuation of K-edge material.

10. The system of claim 6, wherein the attenuation of the replaceable material is measured or estimated.

11. The system of claim 1, further including:
a modeller that generates a mathematical model for generating the estimated native image data, wherein the image estimator generates the estimated native image data based on the mathematical model.

12. A method, comprising:
generating first image data, which is indicative of image data generated from data acquired during a first imaging procedure performed without contrast, from image data acquired during a second imaging procedure performed with contrast, wherein the contrast displaces a material that would be present in the absence of the contrast, and further including determining an effective attenuation of the displaced material, wherein the act of generating the first image data includes generating the first image data based at least on the effective attenuation of the displaced material.

13. The method of claim 12, wherein the first image data and the image data generated from data acquired during the first imaging procedure performed without contrast have a common attenuation.

14. The method of claim 12, wherein the contrast includes a K-edge material, and further including determining an effective attenuation of the K-edge material, wherein the act of generating the first image data includes generating the first image data based at least on the effective attenuation of the K-edge material.

15. A method, comprising:
performing a contrast based spectral imaging procedure on a region of a subject or object, wherein the procedure includes using a contrast agent including at least one contrast material with a known K-edge energy;
generating image data based on image data generated from the spectral imaging procedure;
generating a correction factor for the image data, wherein the correction factor takes into account an effective attenuation of radiation absorbing material native to the subject or object that has been displaced by the contrast agent during the spectral imaging procedure and concentration of contrast agent displacing the radiation absorbing material; and
generating estimated native image data based on the image data and the correction factor.

16. The method of claim 15, wherein the estimated native image data is indicative of image data generated from an imaging procedure in which the contrast agent is not present in the scanned region of the subject or object.

17. The method of claim 15, wherein the contrast agent includes a K-edge material and the is a concentration of K-edge material that displaces the replaceable material native to the subject or object.

18. The method of claim 17, further including determining the concentration of the K-edge material based on an effective attenuation of K-edge material.

19. The method of claim 17, further including estimating the effective attenuation of the replaceable material.

* * * * *